United States Patent [19]
Kleinpeter

[11] 3,718,581
[45] Feb. 27, 1973

[54] ADSORPTION PROCESS FOR RECOVERING CONDENSIBLE COMPONENTS FROM A GAS STREAM

[75] Inventor: Joseph A. Kleinpeter, Ponca City, Okla.

[73] Assignee: Continental Oil Company, Ponca City, Okla.

[22] Filed: March 2, 1971

[21] Appl. No.: 120,081

[52] U.S. Cl. .......................... 208/340, 55/62, 55/74
[51] Int. Cl. ............................................ C10g 5/02
[58] Field of Search ............ 208/310, 340; 55/62, 74

[56] References Cited

UNITED STATES PATENTS

| | | | |
|---|---|---|---|
| 3,197,415 | 7/1965 | Hendrix | 208/340 |
| 3,514,396 | 5/1970 | Fischer | 208/340 |

Primary Examiner—Herbert Levine
Attorney—Joseph C. Kotarski, Henry H. Huth, Robert B. Coleman, Jr., Gerald L. Floyd and Carroll Palmer

[57] ABSTRACT

The present invention relates to an improved cyclic adsorption process for recovering condensible components from a gas stream wherein the condensible components are removed from the adsorbent by contacting it with a heated regeneration gas stream and after being recovered are separated into liquid fractions of differing molecular weights. By the present invention, the adsorbent is periodically washed with quantities of one or more of the recovered liquid fractions so that components adsorbed thereon which are not readily removed by the heated regeneration gas stream are removed by the solvent action of the liquid fraction or fractions thereby preventing the build-up of said components on said adsorbent and the resultant decrease in absorption capacity.

5 Claims, 1 Drawing Figure

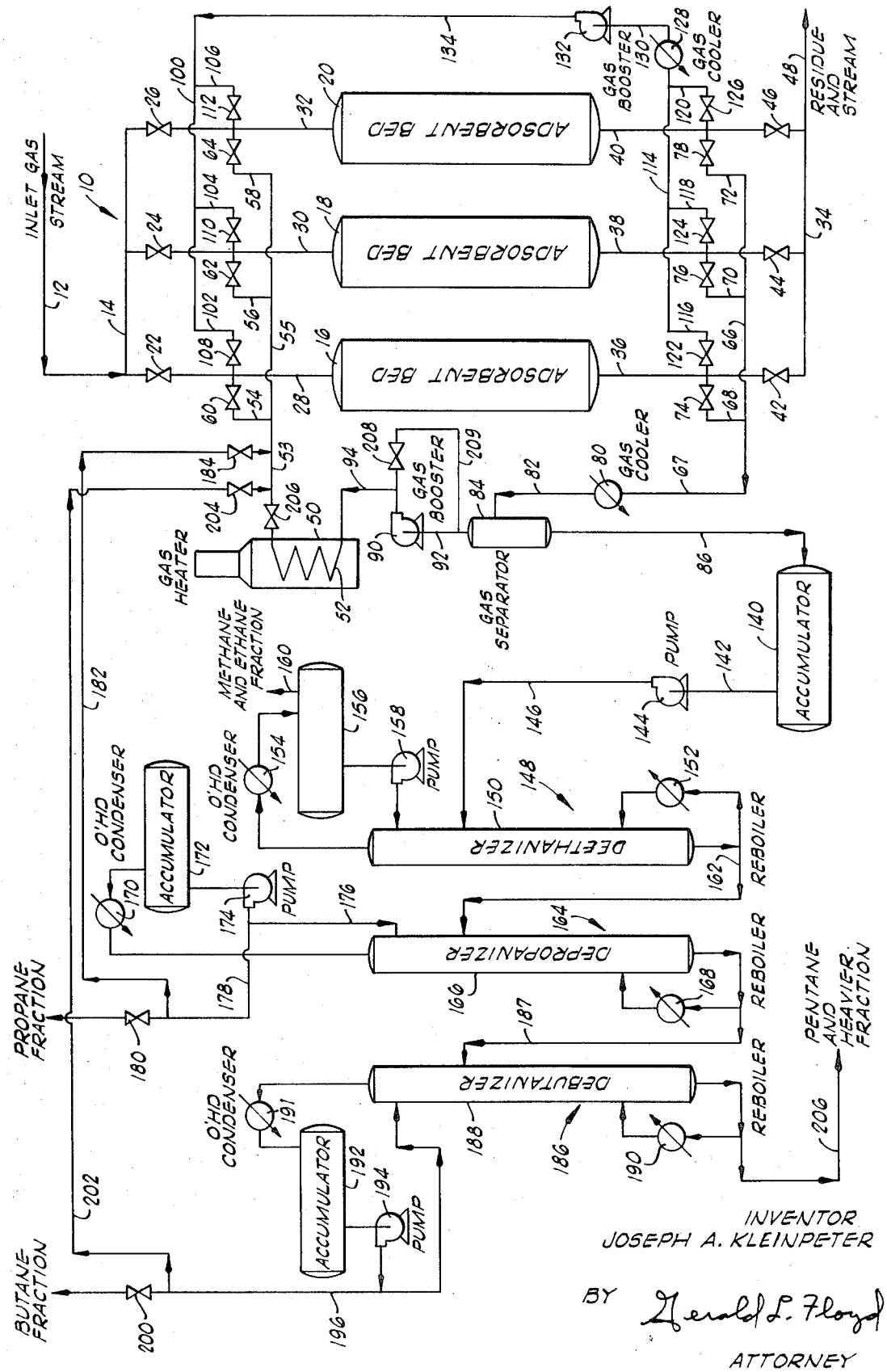

ADSORPTION PROCESS FOR RECOVERING CONDENSIBLE COMPONENTS FROM A GAS STREAM

BACKGROUND OF THE INVENTION

1. Field of the Invention

The present invention relates to an improved adsorption process for recovering condensible components from a gas stream, and more particularly, but not by way of limitation, to a cyclic adsorption process wherein a fixed bed of adsorbent is contacted with an inlet gas stream so that condensible components are adsorbed on the bed, then contacted by a heated regeneration gas stream so that the components are desorbed from the bed and then contacted with a cooling gas stream preparatory to again being contected with the inlet gas stream.

2. Description of the Prior Art

Many various vapor adsorption processes have been developed of the type wherein one or more beds are utilized for adsorbing condensible components from a gas stream while the other beds are being regenerated. In these processes, regeneration of the bed or beds which are saturated with condensible components is accomplished by heating the bed or beds with a heated regeneration gas stream which causes the condensible components to be desorbed from the bed. The desorbed components are condensed and removed from the regeneration gas stream, and very often are separated into liquid fractions of differing molecular weights. The hot bed which has been regenerated is cooled by contacting it with a cooling gas stream preparatory to again being contacted with the inlet gas stream. The various gas streams are continuously switched or cycled so that the bed or beds which have just contacted the inlet gas stream are contacted with the heated regeneration gas stream, the bed or beds which have just been contacted with the heated regeneration gas stream are contacted with the cooling gas stream, and the bed or beds which have just been contacted with the cooling gas stream are contacted with the inlet gas stream.

Quite often, some of the condensible components adsorbed from a gas stream are difficult to regenerate, i.e., the components are not as readily removed from the adsorbent by contact with a heated regeneration gas stream as are other of the adsorbed condensible components. For example, natural gas usually contains adsorbable hydrocarbon compounds which are relatively easy to regenerate, such as methane, ethane and propane, as well as adsorbable hydrocarbon compounds which are relatively difficult to regenerate, such as butanes and heavier hydrocarbon compounds. In an adsorption process wherein a bed of adsorbent is contacted with a gas stream containing both difficult and easy-to-regenerate adsorbable components, all of the adsorbable components are adsorbed on the bed to some degree. Generally, the difficult-to-regenerate components are easily adsorbed, and as a result, are adsorbed first followed by the easy-to-regenerate components. Heretofore, such adsorption processes have been designed in a manner allowing for the removal of the difficult-to-regenerate components from the adsorbent even though the primary purpose of the process may be to recover only the easy-to-regenerate components. This has generally been accomplished by contacting the adsorbent with a heated regeneration gas stream at a higher flow rate than would be required to regenerate only the easy-to-regenerate components, or by increasing the cycle time so that the adsorbent is contacted with the regeneration gas stream for a time sufficient to bring about the removal of the difficult-to-regenerate components. An increase in the cycle time of an adsorption process of the type herein described brings about an increase in the quantity of adsorbent material required. Thus, in either case, the equipment required to carry out the process is of a larger overall size and cost as compared to that which would be required to bring about the removal of the easy-to-regenerate components only. As is well understood by those skilled in the art, if difficult-to-regenerate components are not removed from the absorbent, i.e., if the regeneration gas rate, temperature, or contact time is insufficient to remove all of the adsorbed components, and as a result adsorbed difficult-to-regenerate components remain on the adsorbent, the effective life of the adsorbent and the adsorbent's capacity for easy-to-regenerate components decrease rapidly due to the build-up of the difficult-to-regenerate components thereon.

By the present invention, an improved adsorption process for recovering condensible components from a gas stream containing both difficult and easy-to-regenerate condensible components is provided wherein adsorbed difficult-to-regenerate components are periodically removed from the adsorbent by a novel solvent extraction step thereby reducing the overall size of equipment required to carry out the process as compared to the prior art processes.

SUMMARY OF THE INVENTION

The present invention relates to an improved adsorption process for recovering both difficult and easy-to-regenerate condensible components from an inlet gas stream wherein a fixed adsorbent bed is contacted with said inlet gas stream so that condensible components contained therein are adsorbed on the bed, then contacted with a heated regeneration gas stream so that adsorbed components are desorbed from the bed into said regeneration gas stream, the desorbed components being condensed and recovered from said regeneration gas stream and separated into two or more liquid fractions, and then contacted with a cooling gas stream so that said bed is cooled preparatory to again contacting said inlet gas stream. By the present invention, the bed is periodically washed with one or more of the recovered fractions after it has been contacted with the inlet gas stream and prior to being contacted with the regeneration gas stream so that adsorbed difficult-to-regenerate condensible components not previously removed from the bed by the heated regeneration gas stream are extracted therefrom by the solvent action of the liquid fraction or fractions thereby preventing the build-up of difficult-to-regenerate components on the bed. The liquid fraction or fractions utilized are readily removed from the bed by the heated regeneration gas stream.

It is, therefore, an object of the present invention to provide an improved vapor adsorption process.

A further object of the present invention is the provision of a vapor adsorption process wherein adsorbed difficult-to-regenerate condensible components are removed from the adsorbent by means of a novel solvent extraction step thereby reducing the size and cost of equipment required to carry out the process as compared to prior art processes.

Other and further objects, features and advantages of the present invention will be apparent from the following description of the presently preferred embodiments of the invention, given for the purpose of disclosure and taken in conjunction with the accompanying drawing.

DESCRIPTION OF THE DRAWING

In the drawing, one system which may be used for carrying out the improved process of the present invention is illustrated in diagrammatic form.

DESCRIPTION OF THE PREFERRED EMBODIMENTS

Referring to the drawing, a system which may be used for carrying out the improved process of the present invention is illustrated in diagrammatic form, generally designated by the numeral 10. The system 10 basically comprises a cyclic vapor adsorption system for recovering condensible components in combination with a conventional fractionation system for separating the recovered condensible components into liquid fractions of differing molecular weights. In order to present a clear understanding of the system 10, it will be described in the application of recovering condensible hydrocarbon components from a natural gas stream. However, as will be understood by those skilled in the art, the system 10 or similar systems may be utilized for carrying out the improved process of the present invention for recovering a variety of condensible components from a variety of gas streams.

An inlet natural gas stream containing condensible hydrocarbon components to be recovered enters the system 10 by way of a conduit 12. The conduit 12 is connected to an inlet gas header 14 from where the inlet gas stream is routed to one of three vessels 16, 18 and 20, each of which contains a stationary bed of solid adsorbent material. A variety of commercially available adsorbent materials well known to those skilled in the art may be utilized in the system 10. However, a particularly suitable adsorbent for processing natural gas in accordance with the present invention is activated carbon. Conduits 28, 30 and 32 are connected to inlet connections of the vessels 16, 18 and 20, respectively, and to the inlet gas stream header 14. Valves 22, 24 and 26 are disposed in the conduits 28, 30 and 32 respectively. A residue gas outlet header 34 is provided connected to the outlet connections of the vessels 16, 18 and 20 by conduits 36, 38 and 40, respectively. Valves 42, 44 and 46 are disposed in conduits 36, 38 and 40. The main residue gas header 34 is connected to a conduit 48 which conducts the residue gas from the system 10 to a point of use or further processing.

A closed regeneration gas stream circuit for continuously regenerating one of the adsorbent beds contained within the vessels 16, 18 and 20 is provided. A conventional gas stream heater 50 is provided in the regeneration gas stream circuit having a heating coil 52 disposed therein. A regeneration gas stream inlet header 55 is connected to the outlet connection of the heating coil 52 by conduit 53 having a shut-off valve 206 disposed therein. The header 55 is connected by conduits 54, 56 and 58 to conduits 28, 30 and 32 respectively. Valves 60, 61 and 64 are disposed in the conduits 54, 56 and 58. A regeneration gas stream outlet header 66 is provided for receiving the regeneration gas stream from the vessels 16, 18 and 20. Conduits 68, 70 and 72 are connected to the header 66 and to the conduits 36, 38 and 40. Valves 74, 76 and 78 are disposed in the conduits 68, 70 and 72 respectively. The header 66 is connected to the inlet of a conventional gas stream cooler 80 by a conduit 67, and the outlet of the cooler 80 is connected to a conduit 82 which is in turn connected to a conventional gas-liquid separator 84. Liquids condensed in the gas cooler 80 accumulate in the separator 84 and are removed therefrom by way of a conduit 86. The gas outlet connection of the separator 84 is connected to a conventional gas booster or compressor 90 by way of a conduit 92. The discharge of the compressor 90 is connected to the inlet of the heating coil 52 of the heater 50 by a conduit 94. A bypass conduit 209 having valve 208 disposed therein is connected to the conduits 92 and 94.

A closed cooling gas stream circuit is provided comprised of a cooling gas stream inlet header 100 which is connected to the vessels 16, 18 and 20 by way of conduits 102, 104 and 106. The conduits 102, 104 and 106 are connected to the conduits 28, 30 and 32 and to the header 100. Valves 108, 110 and 112 are disposed in the conduits 102, 104 and 106 respectively. A cooling gas stream outlet header 114 is provided for receiving the cooling gas stream from the vessels 16, 18 and 20. The header 114 is connected by conduits 116, 118 and 120 to the conduits 36, 38 and 40 respectively. Valves 122, 124 and 126 are disposed in the conduits 116, 118 and 120. The header 114 is connected to the inlet of a conventional gas cooler 128, and the discharge connection of the cooler 128 is connected by a conduit 130 to a conventional gas booster or compressor 132. The discharge of the compressor 132 is connected to the cooling gas stream inlet header 100 by a conduit 134.

Assuming that the inlet natural gas stream contains methane, ethane, propane, isobutane, n-butane, isopentane, n-pentane, and heavier hydrocarbon compounds, the liquefied condensible components separated from the regeneration gas stream in the separator 84 is a mixture of these compounds. The liquid hydrocarbon mixture passes by way of conduit 86 into an accumulator 140. From the accumulator 140, the liquid hydrocarbon mixture is passed by way of conduit 142, pump 144 and conduit 146 into a conventional fractionator or deethanizer, generally designated by the numeral 148. The deethanizer 148 functions to separate a fraction comprised primarily of methane and ethane from the hydrocarbon feed mixture, and includes a conventional vapor-liquid contact vessel 150 having a conventional reboiler 152 connected thereto, an overhead condenser 154, an accumulator 156 and pump 158. As is well understood, the deethanizer 148 is operated at a temperature and pressure such that methane and ethane are separated from the feed mixture, a portion of which is condensed in the condenser 154 and accumulated in the accumulator 156. A continuous stream of the condensed methane-ethane fraction is removed from the accumulator 156 by the pump 158 and recycled to the vessel 150 as reflux. The remaining methane-ethane vapor is removed from the accumulator by way of conduit 160 from where it is conducted to a point of use or further processing.

The remaining portion of the hydrocarbon mixture is removed from the bottom of the fractionator 148 by way of a conduit 162 which conducts the mixture to a second fractionator (depropanizer) generally designated by the numeral 164. The depropanizer 164 includes a conventional vapor-liquid contact vessel 166 having a conventional reboiler 168 attached thereto, a condenser 170, an accumulator 172 and a pump 174. The depropanizer 164 is operated at a pressure and temperature such that a fraction comprised primarily of propane is separated from the hydrocarbon feed mixture. Propane vapor separated in the vessel 166 is passed to the condenser 170 wherein it is condensed. The condensed propane passes into the accumulator 172 and is withdrawn therefrom by pump 174. A portion of the condensed propane is recycled to the column 166 and a continuous stream of propane is passed by way of a conduit 178 to storage facilities (not shown). A valve 180 is disposed in the conduit 178, and a conduit 182 is connected to the conduit 178 at a point upstream of the valve 180. The conduit 182 is connected to the conduit 53 previously described, through which the regeneration gas stream is passed. A valve 184 is disposed in the conduit 182.

From the depropanizer 164 the remaining liquid hydrocarbon mixture is passed to a third conventional fractionator (debutanizer) generally designated by the numeral 186 by way of conduit 187. The debutanizer 186 includes a conventional vapor-liquid contact vessel 188 having a conventional reboiler 190 attached thereto, a condenser 191, an accumulator 192 and a pump 194. The debutanizer 186 is operated at a pressure and temperature such that n-butane and isobutane contained in the hydrocarbon mixture are separated therefrom. The separated butane vapor is condensed in the condenser 191 and accumulated in the accumulator 192. From the accumulator 192 the condensed butane fraction is passed by way of a pump 194 and conduit 196 to storage facilities (not shown). A portion of the butane fraction is recycled to the vessel 188 as reflux. The conduit 196 includes a valve 200 disposed therein, and a conduit 202 is connected to the conduit 196 upstream of the valve 200. The conduit 202 is connected to the conduit 53, and a valve 204 is disposed in the conduit 202.

The remaining hydrocarbon mixture comprised of pentanes and heavier hydrocarbon compounds is removed from the bottom of the debutanizer 186 by way of a conduit 206 and is conducted to storage facilities (not shown).

The various valves described above may be any of a variety of pneumatically, hydraulically or electrically operated control valves, either two-way or three-way. The sequential opening and closing of the valves is automatically controlled by a conventional cycle controller, either time or temperature actuated. The cycle controller functions to open certain of the valves and close others at the beginning of and during each cycle so that the flow patterns of the main gas, regeneration gas and cooling gas streams associated with the adsorption system, as well as portions of the propane fraction and butane fraction produced in the fractionators 148, 164 and 186, are successively changed in a predetermined manner, as will be described further hereinbelow.

The regeneration and cooling gas stream circuits of the adsorption system illustrated in the drawing are of the closed type. The term "closed" when referring to the circuits is used herein to mean systems of conduits, gas boosters, valves, etc. wherein gas streams are continuously circulated without the continuous addition or removal of gas. As will be understood, other types of regeneration and cooling gas stream circuits known in the art as "open" circuits may be utilized where gas is continuously added to and removed from the circuits. Further, when closed circuits of the type illustrated in the drawing and described above are used, apparatus and controls (not shown) are provided for maintaining the gas volume circulated at a relatively constant level. In addition, volume-temperature compensator vessels of the type described in United States Letters Pat. No. 3,405,507 dated Oct. 15, 1968 may be utilized in conjunction with the regeneration and cooling gas stream circuits to provide compensation for volume and temperature changes in the regeneration and cooling gas streams.

While three vessels containing beds of solid adsorbent have been described, it will be understood that a variety of cyclic adsorption systems may be utilized for carrying out the improved process of the present invention, which systems may include any number of adsorbent beds, open or closed regeneration gas and cooling gas stream circuits, etc.

OPERATION OF THE SYSTEM 10

In operation of the system 10, a natural gas stream containing condensible hydrocarbon components to be recovered flows into the system 10 by way of a conduit 12 and into one of the vessels 16, 18 or 20. Let it be assumed that the adsorbent bed contained within the vessel 16 is adsorbing the hydrocarbon components from the inlet natural gas stream. The inlet gas stream flows by way of valve 22 and conduit 28 into the vessel 16. Valves 24 and 26 and conduits 30 and 32 serve a similar purpose when the adsorbent beds within the vessels 18 and 20 are contacted with the inlet gas stream. In passing through the vessel 16, the inlet natural gas stream contacts the fixed adsorbent bed contained therein so that condensible hydrocarbon components are adsorbed on the bed and removed from the gas stream. The resultant residue gas stream exits the vessel 16 by way of conduit 36 and valve 42, and is passed into the residue gas stream header 34. Valves 44 and 46 and conduits 38 and 40 serve similarly in subsequent cycles. From the header 34, the residue gas stream is removed from the system 10 by way of the conduit 48 from where it is conducted to a point of use or further processing.

When the bed of adsorbent material within the vessel 16 becomes substantially loaded with condensible hydrocarbon components, it is regenerated by passing through it a heated regeneration gas stream. Further, in accordance with the present invention, difficult-to-regenerate hydrocarbon components, i.e., butane and heavier hydrocarbon compounds adsorbed on the bed and not removed by the heated regeneration gas stream, are periodically removed by washing the bed with the liquid butane and propane fractions separated in the system 10, as will be described further hereinbelow.

When the adsorbent bed contained within the vessel 18 is contacted with the heated regeneration gas stream, it passes from the regeneration gas stream inlet header 55 into the vessel 18 by way of conduit 56, valve 62 and conduit 30. Conduits 54, 28, 58 and 32, and valves 60 and 64 serve similarly when the beds of adsorbent in the vessels 16 and 20 are being regenerated. As the heated regeneration gas stream passes through the adsorbent bed contained within the vessel 18, it heats the adsorbent material and causes hydrocarbon components adsorbed thereon to be desorbed into the regeneration gas stream. The regeneration gas stream containing the desorbed components flows from the vessel 18 by way of conduit 38, conduit 70 and valve 76 into the regeneration gas stream outlet header 66. Conduits 36, 68, 40 and 72 and valves 74 and 78 serve similarly during subsequent cycles. From the header 66 the regeneration gas stream passes by way of conduit 67 into the gas cooler 80 wherein it is cooled to a temperature level such that most or all of the desorbed hydrocarbon components contained therein are condensed. The regeneration gas stream and condensed hydrocarbons then pass through conduit 82 into the liquid separator 84 wherein the liquid hydrocarbons are separated from the regeneration gas stream and removed by way of conduit 86. The remaining lean regeneration gas stream, consisting primarily of methane, exits the liquid separator 84 and passes by way of conduit 92 into the compressor 90. The compressor 90 functions to boost the regeneration gas stream, i.e., raise the pressure thereof so that it is circulated through the regeneration gas stream circuit. From the compressor 90, the regeneration gas stream passes by way of conduit 94 into the heating coil 52 of the heater 50. While within the heating coil 52, the regeneration gas stream is heated to a desired temperature level, and the heated regeneration gas stream passes by way of conduit 53 back to the regeneration gas stream inlet header 55.

When an adsorbent bed has been regenerated, it must be cooled before it can again contact the inlet gas stream. Let it be assumed that the bed of adsorbent material within the vessel 20 is in the process of being cooled. The cooling gas stream is passed from the cooling gas stream inlet header 100 into the vessel 20 by way of conduit 106, valve 112 and conduit 32. Conduits 102, 28, 104 and 30, and valves 108 and 110 serve similarly during subsequent cycles. The adsorbent bed contained within the vessel 20 is contacted by the cooling gas stream passing therethrough causing the bed to be cooled. From the vessel 20 the cooling gas stream is passed into the cooling gas stream outlet header 114 by way of conduit 40, conduit 120 and valve 126. Conduits 36, 116, 38 and 118, and valves 122 and 124 serve similar purposes. From the header 114, the cooling gas stream passes into the gas cooler 128 wherein heat removed from the adsorbent bed contained within the vessel 20 by the cooling gas stream is removed from the cooling gas stream. From the gas cooler 128 the cooling gas stream is passed by way of conduit 130 to the gas booster or compressor 132. The compressor 132 functions to boost the pressure of the cooling gas stream so that it passes by way of conduit 134 back to the cooling gas stream inlet header 100.

A continuous stream of condensed hydrocarbon components flows from the separator 84 by way of conduit 86 into the accumulator 140. As previously described, for a natural gas stream containing methane, ethane, propane, isobutane, n-butane, isopentane, n-pentane, and heavier hydrocarbon condensible components, the liquid accumulating in the separator 84 is a mixture of these components. The hydrocarbon mixture passes from the accumulator 140 by way of conduit 142, pump 144 and conduit 146 into the deethanizer 148. In passing through the deethanizer 148 the hydrocarbon feed mixture is fractionated in a conventional manner so that a fraction consisting primarily of methane and ethane is separated from the feed mixture. The separated methane-ethane fraction is passed by way of conduit 160 to a point of use or further processing. The remaining hydrocarbon mixture passes by way of conduit 162 to the depropanizer 164 wherein a fraction consisting primarily of propane is separated therefrom. As previously described, the liquid propane fraction produced is passed by way of conduit 178 and valve 180 to storage facilities. The remaining feed mixture is passed from the depropanizer 164 to the debutanizer 186 wherein a fraction consisting primarily of isobutane and n-butane is separated therefrom and passed by way of conduit 196 and valve 200 to storage facilities. The remaining feed mixture which consists primarily of pentanes and heavier hydrocarbon compounds is passed to storage facilities by way of conduit 206. A detailed description of the operation of the deethanizer 148, the depropanizer 164 and the debutanizer 186 is not given herein since such operations are conventional and well known to those skilled in the art.

In accordance with the present invention, each of the adsorbent beds contained within the vessels 16, 18 and 20 are periodically washed, first with the separated liquid butane fraction produced by the debutanizer 186, and then with the separated liquid propane fraction produced by the depropanizer 164, so that heavy hydrocarbon components adsorbed on the adsorbent beds and not previously removed during regeneration with the heated regeneration gas stream are extracted from the adsorbent by the solvent action of the butane and propane fractions.

As will be understood by those skilled in the art, the system 10 is operated at a cycle time and a regeneration gas stream circulation rate such that during regeneration of the adsorbent beds by the contact thereof with the heated regeneration gas stream, adsorbed methane, ethane and propane are substantially completely removed therefrom.

While a major portion of the adsorbed butanes and heavier hydrocarbon compounds are also removed by the regeneration gas stream, some of these components remain adsorbed on the beds. That is, by the present invention, the cycle time, regeneration gas stream rate and temperature are not sufficient to bring about the complete regeneration of all of the absorbed condensible hydrocarbon components, and as a result, some of the components, namely butanes and heavier hydrocarbon compounds remain adsorbed on the beds, the quantity thereof increasing with each succeeding cycle.

Depending upon the quantitative ratio of difficult-to-regenerate components (butanes and heavier hydrocarbon compounds) to the easy-to-regenerate components (methane, ethane and propane) contained in the inlet gas stream, the solvent extraction step of the present invention may be required to be carried out on the bed regenerated during each cycle. However, the butanes and heavier content of a natural gas stream is normally less than the ethane and propane content so that the extraction step may be carried out on each bed at intervals equal to a predetermined number of cycles.

For example, the solvent extraction step may be carried out on each of the adsorbent beds contained within the vessels 16, 18 and 20 every six cycles so that each bed is regenerated one time with the heated regeneration gas stream only and the next time by solvent extraction in combination with contact by the heated regeneration gas stream.

The particular interval at which the difficult-to-regenerate condensible components should be extracted from the adsorbent beds depends upon the particular gas stream being processed, the ratio of difficult-to-regenerate components to easy-to-regenerate components contained therein and various other factors. By using engineering sizing and costing data and techniques, well known to those skilled in the art, the interval which will bring about the least costly apparatus for carrying out the process of the present invention may be determined.

Let it be assumed that the adsorbent bed contained within the vessel 18 is to be regenerated during a particular cycle so that difficult-to-regenerate hydrocarbon components (butane and heavier compounds) adsorbed thereon as well as easy-to-regenerate components are removed therefrom. During a first part of the cycle, the circulation of the heated regeneration gas stream is stopped by closing the valve 206 in the conduit 53 and opening the valve 208 in the gas compressor bypass conduit 209. The opening of valve 208 causes the gas compressor 90 to be bypassed and the closing of valve 206 prevents regeneration gas from passing into the heated regeneration gas stream header 55. Simultaneously, valve 200 in conduit 196 is closed and valve 204 in conduit 182 is opened which causes the separated liquid butane fraction passing through the conduit 196 to be diverted by way of conduit 202 into conduit 53. From conduit 53 the liquid butane passes by way of the regeneration gas stream inlet header 55, conduit 56, valve 62 and conduit 30 into the vessel 18. As the liquid butane passes through the vessel 18 it contacts the bed of adsorbent contained therein and removes adsorbed pentanes and heavier hydrocarbon compounds therefrom by solvent action. The liquid butane exits the vessel 18 by way of conduit 38, valve 76 and conduit 70, and passes into the regeneration gas stream outlet header 66. From the header 66, the liquid butane passes by way of conduit 67, the cooler 80 and conduit 82 into the separator 84. From the separator 84 the liquid butane passes into the accumulator 140 and back through the fractionators 148, 164 and 186. After a period of time sufficient to remove the pentane and heavier hydrocarbon components from he adsorbent bed, valve 200 is opened, valve 204 is closed, valve 180 in conduit 178 is closed and valve 184 in conduit 182 is opened. This causes the butane fraction to pass to the storage facilities previously mentioned, and the separated liquid propane fraction passing through conduit 178 to be diverted by way of conduit 182 into the conduit 53. The diverted propane fraction passes through the vessel 18 in the same manner as described above for the butane fraction, thereby displacing butane from the adsorbent bed contained within the vessel 18. The propane wash is necessary since during the washing of the bed with butane, a portion of the butane is adsorbed on the bed. The propane wash removes the adsorbed butane by solvent action, and upon completion of washing the bed with the propane fraction, propane only is adsorbed on the bed. After washing with propane for a predetermined period of time, valve 180 is opened, valve 184 is closed, valve 206 opened, and valve 208 closed. This causes the wash step to be terminated and the circulation of the heated regeneration gas stream through the vessel 18 to be started. The heated regeneration gas stream is circulated through the vessel 18 during the latter part of the cycle so that propane remaining in the adsorbent bed is removed therefrom. The liquid fraction or fractions utilized in accordance with the present invention must remove adsorbed difficult-to-regenerate components from the beds by solvent action, and the portion of the liquid remaining adsorbed on the beds after the extraction step is carried out must be readily removed by the heated regeneration gas stream. This may be accomplished by washing the beds with a plurality of liquid fractions as has been described above, the first wash being carried out using a fraction having the molecular weight required to dissolve the adsorbed difficult-to-regenerate component of highest molecular weight, and the last wash using a fraction of lower molecular weight which dissolves the solvent remaining in the beds and is readily removed by the regeneration gas stream. As will be readily apparent, a single fraction may be used in the application where it dissolves the difficult-to-regenerate components and is also readily removed by the regeneration gas stream.

In order to present a clear understanding of the improved process of the present invention as carried out in the system 10, the adsorbent bed and valve sequence for the system 10 through four cycles is shown in Table I below. The table is based on extracting the difficult-to-regenerate components from each bed every six cycles. Stated in another way, one of the adsorbent beds is solvent extracted every other cycle. As will be understood, the regeneration of a bed by washing it with the butane and propane fractions, and then contacting it with the heated regeneration gas stream, is carried out in a time period equal to the adsorption process cycle time.

TABLE I

Adsorbent bed sequence for System 10

| | | Second cycle | | | | Fourth cycle | | |
|---|---|---|---|---|---|---|---|---|
| | First cycle | First regeneration step | Second regeneration step | Third regeneration step | Third cycle | First regeneration step | Second regeneration step | Third regeneration step |
| Adsorbent bed vessel: | | | | | | | | |
| 16 | Adsorbing | Washing with butane fraction. | Washing with propane fraction. | Regenerating with haeted regeneration gas stream. | Cooling | Adsorbing | Adsorbing | Adsorbing. |
| 18 | Regenerating with heated regeneration gas stream. | Cooling | Cooling | Cooling | Adsorbing | Washing with butane fraction. | Washing with propane fraction. | Regenerating with heated regeneration gas stream. |
| 20 | Cooling | Adsorbing | Adsorbing | Adsorbing | Regenerating with heated regeneration gas stream. | Cooling | Cooling | Cooling. |
| Valves: | | | | | | | | |
| 22 | Open | Closed | Closed | Closed | Closed | Open | Open | Open. |
| 24 | Closed | do | do | do | Open | Closed | Closed | Closed. |
| 26 | do | Open | Open | Open | Closed | do | do | Do. |
| 42 | Open | Closed | Closed | Closed | do | Open | Open | Open. |
| 44 | Closed | do | do | do | Open | Closed | Closed | Closed. |
| 46 | do | Open | Open | Open | Closed | do | do | Do. |
| 60 | do | do | do | do | do | do | do | Do. |
| 62 | Open | Closed | Closed | Closed | do | Open | Open | Open. |
| 64 | Closed | do | do | do | Open | Closed | Closed | Closed. |
| 74 | do | Open | Open | Open | Closed | do | do | Do. |
| 76 | Open | Closed | Closed | Closed | do | Open | Open | Open. |
| 78 | Closed | do | do | do | Open | Closed | Closed | Closed. |
| 108 | do | do | do | do | do | do | do | Do. |
| 110 | do | Open | Open | Open | Closed | do | do | Do. |
| 112 | Open | Closed | Closed | Closed | do | Open | Open | Open. |
| 122 | Closed | do | do | do | Open | Closed | Closed | Closed. |
| 124 | do | Open | Open | Open | Closed | do | do | Do. |
| 126 | Open | Closed | Closed | Closed | do | Open | Open | Open. |
| 180 | do | Open | do | Open | Open | do | Closed | Do. |
| 184 | Closed | Closed | Open | Open | Closed | Closed | Open | Closed. |
| 200 | Open | do | do | do | Open | do | do | Open. |
| 204 | Closed | Open | Closed | Closed | Closed | Open | Closed | Closed. |
| 206 | Open | Closed | do | Open | Open | Closed | do | Open. |
| 208 | Closed | Open | Open | Closed | Closed | Open | Open | Closed. |

The following example serves to further illustrate the improved process of the present invention.

A 20 mmscf/day natural gas stream of the composition given in Table II below and at inlet conditions of 300 psia and 70°F is processed by the system 10 shown in the drawing with the recovered condensible components being hydrocarbon compounds contained therein.

TABLE II

COMPOSITION OF INLET GAS STREAM

| Component | Concentration (Mol %) |
|---|---|
| Methane | 89.80 |
| Ethane | 5.55 |
| Propane | 3.13 |
| Isobutane | 0.46 |
| Normal Butane | 0.70 |
| Isopentane | 0.19 |
| Normal Pentane | 0.10 |
| Hexane — Plus | 0.07 |
| | 100.00 |

13,000 pounds of activated carbon adsorbent material are contained in each of the vessels 16, 18 and 20, and a cycle time of 30 minutes is used.

During a first cycle as shown in Table I the inlet gas stream contacts the adsorbent bed contained within the vessel 16 and a 19.6 mmscf/day residue gas stream is produced which is withdrawn from the system 10 by way of the conduit 48 at an average temperature of 90°F.

Simultaneously, the adsorbent bed contained within the vessel 18 is contacted with a 10 mmscf/day regeneration gas stream. The heated regeneration gas stream is at an inlet temperature of 600°F and exits the vessel 18 at an initial temperature of 90°F, reaching a maximum temperature of 580°F. The regeneration gas stream is cooled to a temperature of 80°F as it passes through the cooler 80 resulting in 11,920 gallons/day of condensed hydrocarbon compounds which are removed from the separator 84. The remaining regeneration gas stream exits the separator 84 at the rate of 19.6 mmscf/day and is of the composition given in Table III below:

TABLE III

COMPOSITION OF REGENERATION GAS STREAM

EXITING SEPARATOR 84

| Component | Concentration (Mol %) |
|---|---|
| Methane | 59.54 |
| Ethane | 6.50 |
| Propane | 26.14 |
| Isobutane | 2.95 |
| Normal Butane | 3.83 |
| Isopentane | 0.66 |
| Normal Pentane | 0.29 |
| Hexane — Plus | 0.09 |
| | 100.00 |

An 18 mmscf/day stream of cooling gas is simultaneously passed into the vessel 20 at a temperature of 90°F. The cooling gas stream initially exiting the vessel 20 is at a temperature of 350°F and reaches a maximum temperature of 525°F. The bed of adsorbent contained within the vessel 20 is cooled to an average temperature of 100°F.

A 11,920 gallon/day mixture of hydrocarbon compounds passes from the separator 84 into the accumulator 140. From the accumulator 140 the liquid hydrocarbon mixture passes into the deethanizer 148 wherein it is heated to an average temperature of 222°F at a pressure of 545 psia. As a result, a 45,600 scf/day of methane and ethane fraction is separated from the hydrocarbon feed stream at a temperature of 100°F. The bottom liquid hydrocarbon mixture from the deethanizer passes into the depropanizer wherein it is heated to an average temperature of 160°F at a pressure of 295 psia, resulting in the separation of a 5025 gallon/day liquid propane fraction at a temperature of 107°F which passes through the conduit 178. The bottoms mixture from the depropanizer is passed to the debutanizer 186 wherein it is heated to an average temperature of 270°F at a pressure of 145 psia resulting in the separation of a 3,860 gallon/day butane fraction which passes through the conduit 196 at a temperature of 90°F. The debutanizer bottoms mixture comprised of pentanes and heavier hydrocarbon compounds in the amount of 3,035 gallons/day is passed to storage through the conduit 206.

During the second cycle as shown in Table I, the adsorbent bed contained within the vessel 16 is first washed with the 3,860 gallon/day butane fraction for 10 minutes, then washed with the 5,025 gallon/day propane fraction for 10 minutes, and then contacted with the 10 mmscf/day heated regeneration gas stream for 10 minutes. At the end of the second cycle the adsorbent bed contained within the vessel 16 is heated to a temperature of approximately 400°F.

Thus, the present invention is well adapted to carry out the objects and attain the ends and advantages mentioned as well as those inherent therein. While presently preferred embodiments of the invention are given for the purpose of disclosure, numerous changes can be made which will readily suggest themselves to those skilled in the art and which are encompassed within the spirit of the invention disclosed and claimed herein.

What is claimed is:

1. In a cyclic adsorption process for recovering both difficult and easy-to-regenerate condensible hydrocarbon components from a natural gas stream wherein a bed of solid adsorbent is contacted with said natural gas stream so that said condensible hydrocarbon components contained therein are adsorbed on the bed, then contacted with a heated regeneration gas stream so that said adsorbed hydrocarbon components are desorbed into said regeneration gas stream, the desorbed hydrocarbon components being condensed and recovered from said regeneration gas stream and separated into a plurality of liquid hydrocarbon fractions of differing molecular weights, and then contacted with a cooling gas stream so that said bed is cooled preparatory to again contacting said natural gas stream, the improvement comprising:
   a. washing said bed with a first of said liquid hydrocarbon fractions at intervals equal to a predetermined number of cycles and during a cycle after said bed has been contacted with said natural gas stream, said fraction having the property of extracting from said bed by solvent action difficult-to-regenerate hydrocarbon compounds not previously removed therefrom by said heated regeneration gas stream, thereby preventing the build-up of said difficult-to-regenerate hydrocarbon compounds on said bed;
   b. washing said bed after step (a) above with a second of said liquid hydrocarbon fractions, said fraction having the property of extracting from said bed by solvent action the portion of the first liquid fraction adsorbed on the bed during step (a) and being readily removed from said bed by said heated regeneration gas stream; and
   c. contacting said bed with said heated regeneration gas stream so that said second liquid fraction and condensible hydrocarbon components remaining in the bed after step (b) are removed therefrom.

2. The process of claim 1 wherein the adsorbent is activated carbon.

3. The process of claim 2 wherein the first liquid hydrocarbon fraction is a fraction consisting primarily of a mixture of n-butane and iso-butane.

4. The process of claim 3 wherein the second liquid hydrocarbon fraction consists primarily of propane.

5. In an adsorption process for recovering ethane and propane from a natural gas stream wherein a bed of solid adsorbent is contacted with said natural gas stream so that said ethane and propane as well as other condensible hydrocarbon components contained therein are adsorbed on the bed, then contacted with a heated regeneration gas stream so that said adsorbed hydrocarbon components are desorbed therefrom into said regeneration gas stream, the desorbed hydrocarbon components being condensed and recovered from said regeneration gas stream and separated into a liquid fraction consisting primarily of ethane, a liquid fraction consisting primarily of propane, a liquid fraction consisting primarily of butanes, and a liquid fraction consisting primarily of pentanes and heavier hydrocarbon compounds, and then contacted with a cooling gas stream so that said bed is cooled preparatory to again being contacted with said natural gas stream, the improvement comprising:
   periodically washing the bed after it has been contacted with said natural gas stream and prior to being contacted with said heated regeneration gas stream with a quantity of said recovered butane fraction so that difficult-to-regenerate pentanes and heavier hydrocarbons adsorbed on the bed not previously removed therefrom by the heated regeneration gas stream are extracted from said bed by the solvent action of said liquid butane fraction thereby preventing a build-up of said pentanes and heavier hydrocarbon compounds on said bed; and
   washing the bed after it has been washed with the recovered butane fraction and prior to being contacted with said heated regeneration gas stream with a quantity of said recovered propane fraction so that butanes and additional heavier hydrocarbon compounds remaining adsorbed on the bed are extracted therefrom by the solvent action of said propane fraction, said propane fraction being removed from the bed by the heated regeneration gas stream.

* * * * *